United States Patent
Chowdhary et al.

(10) Patent No.: US 12,164,888 B2
(45) Date of Patent: *Dec. 10, 2024

(54) REPLACING REMOTE DEVICE FUNCTIONS

(71) Applicant: BrowserStack Limited, Dublin (IE)

(72) Inventors: Kunal Chowdhary, Mumbai (IN); James Barboza, Mumbai (IN); Hitesh Raghuvanshi, Ujjain (IN)

(73) Assignee: BrowserStack Limited, Dublin (IE)

( * ) Notice: Subject to any disclaimer, the term of this patent is extended or adjusted under 35 U.S.C. 154(b) by 202 days.

This patent is subject to a terminal disclaimer.

(21) Appl. No.: 17/955,766

(22) Filed: Sep. 29, 2022

(65) Prior Publication Data
US 2023/0333820 A1    Oct. 19, 2023

Related U.S. Application Data

(63) Continuation of application No. 17/720,275, filed on Apr. 13, 2022, now Pat. No. 11,481,194.

(51) Int. Cl.
*G06F 8/30* (2018.01)
*G06F 8/41* (2018.01)
*G06F 8/53* (2018.01)
*G06F 8/61* (2018.01)

(52) U.S. Cl.
CPC ............ *G06F 8/30* (2013.01); *G06F 8/41* (2013.01); *G06F 8/53* (2013.01); *G06F 8/61* (2013.01)

(58) Field of Classification Search
CPC ..... G06F 8/61; G06F 8/53; G06F 8/41; G06F 8/30
See application file for complete search history.

(56) References Cited

U.S. PATENT DOCUMENTS

| | | | |
|---|---|---|---|
| 9,442,707 B2 * | 9/2016 | Sathyanathan | G06F 8/41 |
| 2006/0150141 A1 * | 7/2006 | Hong | G06F 8/316 |
| | | | 717/105 |
| 2015/0378871 A1 * | 12/2015 | Asthana | G06F 8/443 |
| | | | 717/122 |
| 2017/0242987 A1 * | 8/2017 | Williams | G06F 21/128 |

FOREIGN PATENT DOCUMENTS

CN    105740036 A * 7/2016 ............... G06F 8/41

* cited by examiner

*Primary Examiner* — Phillip H Nguyen
(74) *Attorney, Agent, or Firm* — Cognition IP, P.C.; Edward Steakley; Saleh Kaihani

(57) ABSTRACT

A software development infrastructure can enable user developers to select remote hardware devices to develop and test their software programs. For some tests and development activity, physical access to the remote device can be provided by the infrastructure administrator by replacing the internal calls of an application with mimic code, which can respond to application requests for sensor data, as if the user was physically handling the remote device at the same location.

20 Claims, 8 Drawing Sheets

REPLACING REMOTE DEVICE FUNCTIONS

CROSS-REFERENCE TO RELATED APPLICATIONS

This application is a continuation of U.S. application Ser. No. 17/720,275, filed on Apr. 13, 2022, which is hereby incorporated by reference in its entirety.

BACKGROUND

Field

This invention relates generally to the field of enabling a remote device infrastructure for software development on a remote device, and more particularly to systems and methods for replacing select functionality of the remote device and mirroring others.

Description of the Related Art

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

The multitude of computers, mobile devices and platforms have given businesses and consumers a vast array of options when they choose a device. The plethora of choices include both hardware and software. Naturally, software, application and website developers have a keen interest in ensuring their products work seamlessly across the existing hardware and platforms, including older devices on the market. This creates a challenge for the developers to properly test their products on the potential devices and platforms that their target consumer might use. On the one hand, acquiring and configuring multiple potential target devices can strain the resources of a developer. On the other hand, the developer may not want to risk losing a potential market segment by disregarding a particular platform in his typical development cycle. Even for prominent platforms, such as iOS® and Android®, at any given time, there are multiple generations and iterations of these devices on the market, further complicating the development and testing process across multiple platforms. Even in a given platform, a variety of software, operating systems and browser applications are used by a potential target audience of a developer. This dynamic illustrates a need for a robust infrastructure that enables developers to test their products across multiple devices and platforms, without having to purchase or configure multiple devices and platforms.

SUMMARY

The appended claims may serve as a summary of this application.

BRIEF DESCRIPTION OF THE DRAWINGS

These drawings and the associated description herein are provided to illustrate specific embodiments of the invention and are not intended to be limiting.

DETAILED DESCRIPTION

Figure 1:
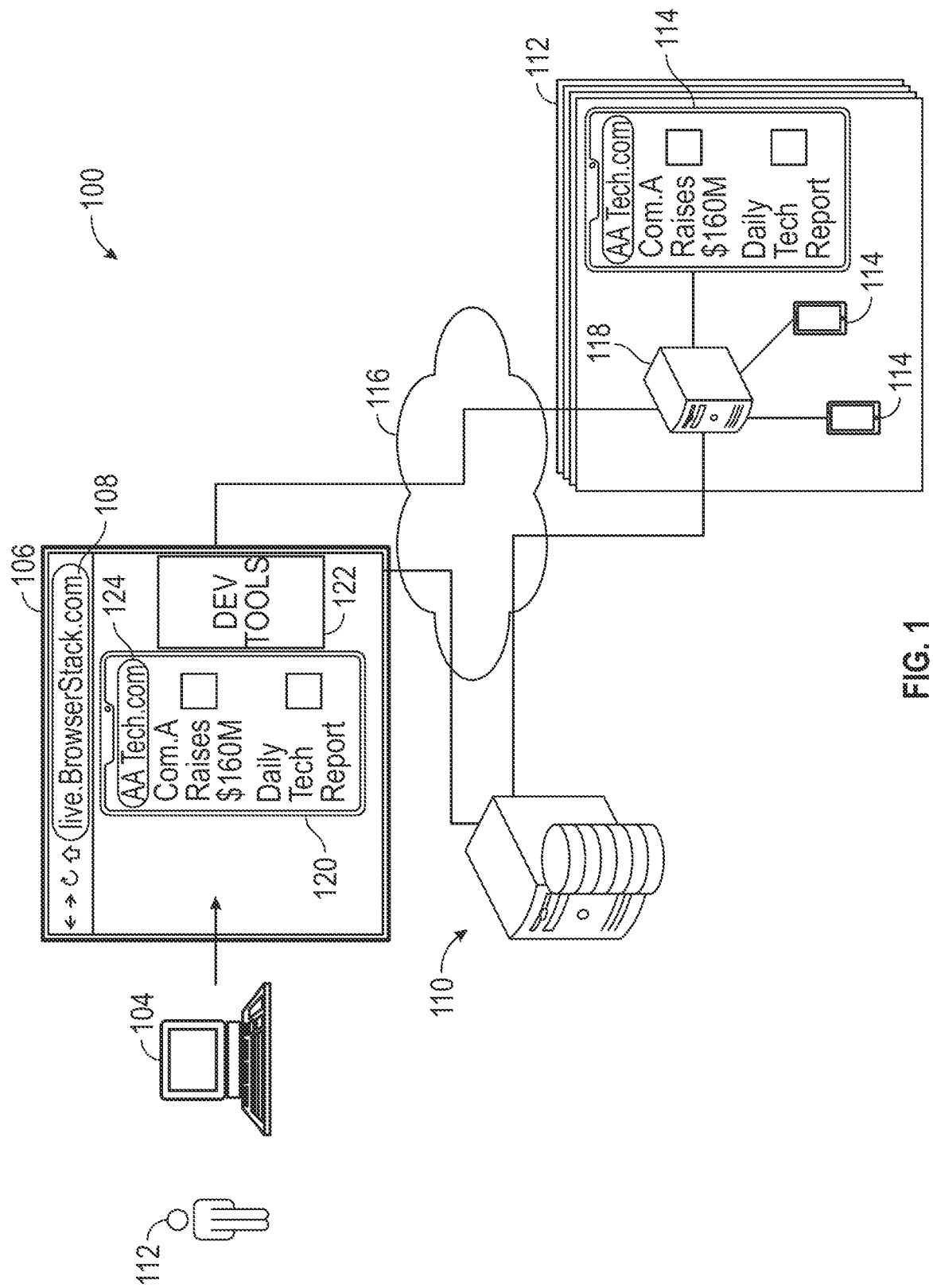
FIG. 1 illustrates an example remote development system (RDS).

The following detailed description of certain embodiments presents various descriptions of specific embodiments of the invention. However, the invention can be embodied in a multitude of different ways as defined and covered by the claims. In this description, reference is made to the drawings where like reference numerals may indicate identical or functionally similar elements.

Unless defined otherwise, all terms used herein have the same meaning as are commonly understood by one of skill in the art to which this invention belongs. All patents, patent applications and publications referred to throughout the disclosure herein are incorporated by reference in their entirety. In the event that there is a plurality of definitions for a term herein, those in this section prevail. When the terms "one", "a" or "an" are used in the disclosure, they mean "at least one" or "one or more", unless otherwise indicated.

Software developers, particularly website, web application and mobile device application developers have a desire to test their products on a multitude of hardware and software platforms that their target audience may use. A variety of mobile device manufacturers provide the hardware consumers and businesses use. Examples include, devices manufactured by Apple Inc., Google LLC, Samsung Electronics Co. Ltd., Huawei Technologies Co. Ltd. and others. Similarly, a variety of operating systems for consumer electronic devices exist. Examples include Apple iOS®, Android® operating system (OS), and Windows® Mobile, Windows® Phone and others. Furthermore, end-users have a variety of choices as far as the web browser application they can use. Examples include Safari®, Chrome®, FireFox®, Windows Explorer®, and others. This variety of choice presents a difficult challenge for a web/app developer to test and develop products on potential target devices. Traditionally, the developer might have to acquire a test device and spend resources configuring it (for example, by installing a target OS, browser, etc.) as well as a secondary hardware device to connect the test device through the secondary hardware device to a local machine of the developer, in order to write code and conduct tests on the test device. The sheer variety of possible devices, operating systems, browsers and combinations of them are numerous and can present a logistical hurdle to the developer.

A testing provider can enable a remote development system (RDS), having a multitude of remote devices for a developer to connect to and conduct tests and development activity. The developer can connect to the RDS, select a remote device, select a configuration (e.g., a particular browser, etc.) and run tests and development activity using the selected remote device. The RDS can include a server powering a website or a desktop application on the client or developer-side, which the developer can use to launch a dashboard for connecting to the RDS and for conducting tests and development activity. The dashboard can include a mirrored display of the remote device presented to the developer. The RDS can capture developer inputs and transmit them to the remote device. The RDS mirrors the display of the remote device on the developer's local machine and simultaneously captures the developer's interactions inputted onto the mirrored display and transfers those commands to the remote device. In a typical case, the developer can use a keyboard and mouse to input interactions onto the mirrored display. When the remote device is a smart phone device, the RDS translates those input interactions compatible with the smart phone. Examples of smart phone input interactions include gestures, pinches, swipes, taps, and others. The remote device display is mirrored on the developer's local machine. In this manner, the developer can experience a seamless interaction with the remote device using the developer's local machine, as if the remote device were physically present at the location of the developer. The RDS can be used both for development of launched and unlaunched products.

In some scenarios, the remote device, or an application running on the remote device, may require an input from an end-user or a developer testing an end-user interaction, in a format that can require the user and the remote device to be physically in the same location, or for the user to provide an input that requires the user physically handling the remote device and/or be in the same location as the remote device. An example of this scenario is when an application requires biometric information from a user in the form of facial recognition request or fingerprint request. Another example is when an application requests access to the camera of the device its running on to use the camera as a scanner, for example, to scan a QR code, a barcode or to receive other items as an image. Software features requiring the user and the device, running the software to be in the same location can be termed same-location interactions. In these scenarios, the RDS can enable the developer to develop and test their applications, including those applications having same-location interactions.

FIG. 1 illustrates an example RDS 100. Although some embodiments use the RDS 100 in the context of testing and software development, the RDS 100 can be used to enable a remote session for any purpose. Testing is merely provided as an example context of usage area of the system and infrastructure of the RDS 100. A user 112 uses a local machine 104 to launch a browser 106 to access a dashboard application to interact with the RDS 100, connect to a remote device and to conduct tests on the remote device. In some embodiments, the dashboard website/web application may be replaced by a desktop application, which the user 102 can install on the local machine 104. The user 102 may be a software developer, such as a website developer, web application developer or a mobile application developer. The local machine 104, in a typical case, may be a laptop or desktop computer, which the user 102 can use to write software code, debug, or run tests on a website/web application or mobile application. The user 102 can enter a uniform resource locator (URL) 108 in the browser 106 to connect to the dashboard application powered by a server 110. The server 110 can enable the browser 106 and a remote device 114 to establish a connection. The RDS 100 can use the connection for streaming the display of a remote device 114 onto the browser 106 in order to mirror the display of the remote device 114 and present it to the user 102. The RDS 100 can also capture user inputs entered into the mirrored display and input them to the remote device 114.

The RDS 100 can include multiple datacenters 112 in various geographical locations. The datacenters 112 can include a variety of test devices for the users 102 to connect with and to conduct tests. In this description, the test devices in datacenters 112 are referred to as remote devices 114, as they are remote, relative to the user 102 and the user's local machine 104. A variety of communication networks 116 can be used to enable connection between the browser 106, the server 110 and the remote device 114. The remote devices 114 can include various hardware platforms, provided by various manufacturers, different versions of each brand (for example, old, midmarket, new) and optionally various copies of each brand, to enable availability for numerous users 102 to connect and conduct tests.

The RDS 100 can use a host 118 connected to one or more remote devices 114. In some embodiments, the browser 106 does not directly communicate with the remote device 114. The host 118 enables communication between the browser 106 and the remote device 114 through one or more private and/or public communication networks and other components of the RDS 100, such as the server 110 or other additional components. The host 118 can be a desktop, laptop, or other hardware connected with a wired or wireless connection to the remote device 114. The hardware used for the host 118 can depend on the type of the remote device 114 that it hosts. Examples of host 118 hardware can include Apple Mac Mini® computers for iPhone® and iOS® devices and Zotac® for Android® devices.

The RDS 100 mirrors the display of the remote device 114 on the browser 106, by generating a display 120 on the browser 106. In some embodiments, the display 120 can be a graphical, or pictorial replica representation of the remote device 114. For example, if an iPhone® 12 device is chosen, the display 120 can be an image of an iPhone® 12. The RDS 100 mirrors the display of the remote device 114 on the display 120 by streaming a video feed of the display of the remote device 114 on the display 120. In some embodiments, the video stream used to mirror the display of the remote device 114 is generated by capturing and encoding screenshots of the display of the remote device 114 into a video stream feed of high frames per second to give the user 102 a seamless interaction experience with the display 120. In other embodiments, the display 120 can be generated from a video stream from the remote device 114. Using input devices of the local machine 104, the user 102 can interact with the display 120, in the same manner as if the remote device 114 were locally present.

The RDS 100 captures and translates the user interactions to input commands compatible with the remote device 114 and inputs the translated input commands to the remote device 114. The display responses of the remote device 114 are then streamed to the user 102, via display 120. In some embodiments, the user 102 has access to and can activate other displays and menu options, such as developer tools display 122. An example usage of the RDS 100, from the perspective of the user 102, includes, the user 102, opening a browser on the remote device 114, via menu options provided by the dashboard application. The user 102 can access the dashboard application via the browser 106 on the user's local machine 104. The RDS 100 opens the user's selected browser on the remote device 114 and generates a display of the remote device 114 and the remotely opened browser on the browser 106 on the user's local machine 104. The user 102 can then use a mouse to click on a URL field 124 in the display 120, which corresponds to the URL field in the browser on the remote device 114. The user 102 can subsequently enter a URL address in the URL field 124. Simultaneously, the user's interactions, such as mouse clicks and keyboard inputs are captured and translated to the input commands compatible with the remote device 114 at the datacenter 112. For example, the mouse click in the URL field 124 is translated to a tap on the corresponding location on the display of the remote device 114 and the keyboard inputs are translated to keyboard inputs of the remote device 114, causing the remote device 114 to open the user requested URL and download the user requested website. Simultaneously, a video stream of the display of the remote device 114 is sent to and generated on the display 120 on browser 106. In this manner, the user perceives entering a URL in the URL field 124 and seeing the display 120 (a replica of the remote device 114) open the requested URL. Additional interactions of the user 102 can continue in the same manner. The user 102 can use the RDS 100 in the manner described above to perform manual or automated testing.

The display 120 is a pictorial and graphical representation of the remote device 114. The RDS 100 does not open a copy of the browser opened on the remote device 114 or conduct simultaneous parallel processes between the remote device 114 and the local machine 106. Instead, the RDS 100 streams a video feed from the remote device 114 to generate the display 120. Consequently, the user's interactions is inputted to the display 120, appearing as if a functioning browser is receiving the interactions, while the RDS 100 captures, transfers and translates those interactions to the remote device 114, where the functioning browser is operating on the remote device 114.

When the user is testing and developing an application using the RDS 100, some application functions can require device physical sensor data. These can include same-location interactions or features, such as the application requesting biometric sensor data for authentication, or an image from the camera of the remote device. In the context of the RDS 100, the user cannot physically provide the biometric information or images to provide input to the remote device sensors because the user and the remote device are not in the same location. In these scenarios, the RDS 100 can be configured to enable sensor instrumentation on a remote device. Sensor instrumentation refers to enabling the ability for a user to provide sensor input data remotely and the remote device providing an output to the user's application based on the user provided sensor input data. Sensor instrumentation of a remote device can involve a variety of operations, including bypassing, replacing and/or reconfiguring the native operations of the remote device, in order to mimic the behavior of the device as if the user were present and providing such inputs.

Figure 2:
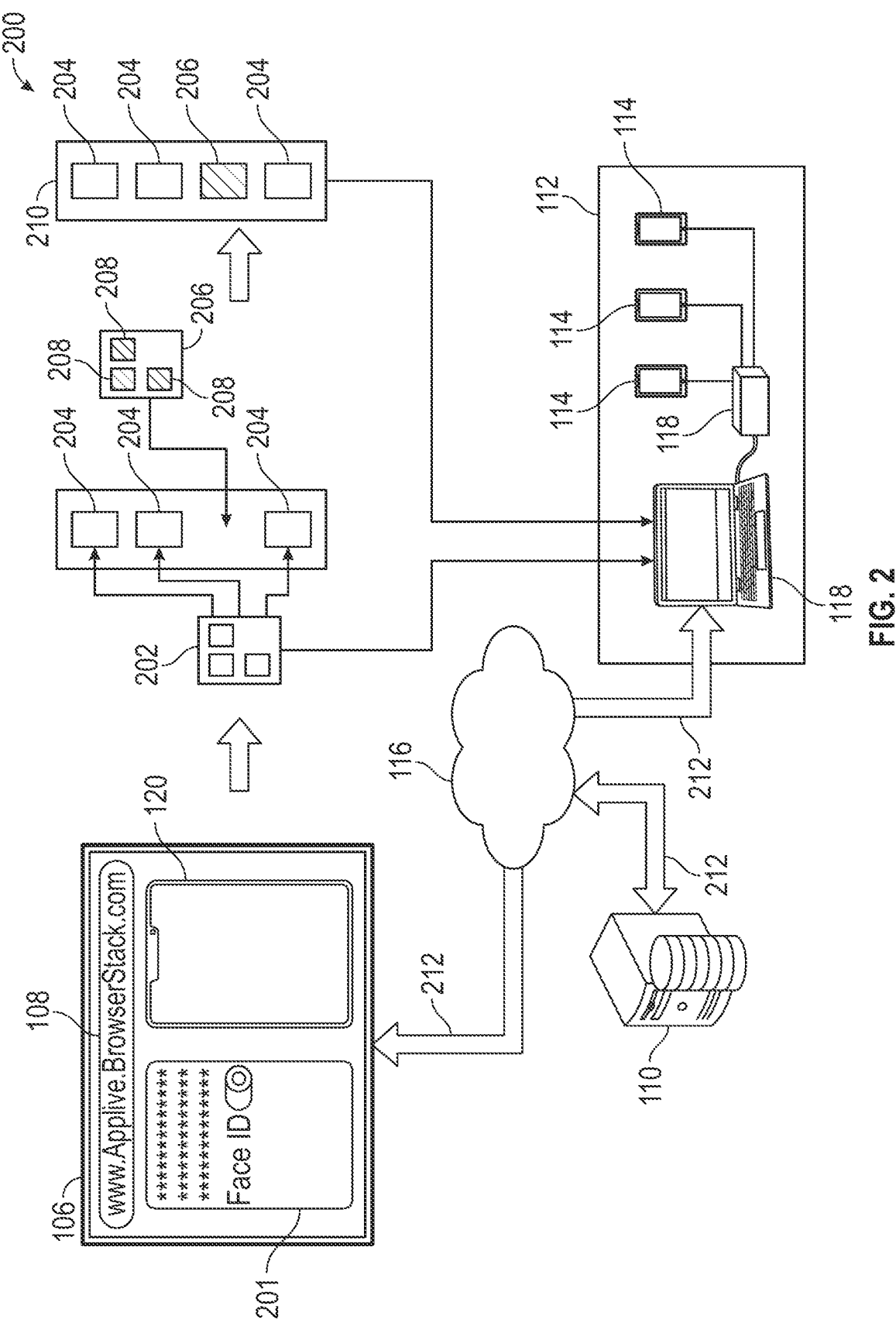
FIG. 2 illustrates a diagram of an example operation of the RDS for remote device sensor instrumentation.

FIG. 2 illustrates a diagram 200 of the operations of the RDS 100 for remote device sensor instrumentation. The RDS 100 can receive the application 202 from the user, via a dashboard or the browser 106. In some embodiments, a side panel 201 can enable the user to request sensor instrumentation. In other embodiments, the sensor instrumentation can be automatic. The application 202 can be decompiled into various components 204. In some embodiments, the application 202 can be parsed, and software calls for sensor input data, such as biometric data or image data can be flagged as same-location interactions. A sensor mimic code (SMC) 206 can be generated with components 208, which when executed, can replace, or bypass the native functionality of the remote device 114, and/or the application 202, to provide mimicked sensor input data. For example, if the user and the remote device were in the same location, and the user application requested facial recognition authentication, the remote device's native facilities receive sensor input from the camera of the remote device, perform image recognition and provide a success or failure code to the user's application. The SMC 206 can replace the native facial recognition functionality of the remote device, in part or in whole, by providing user selected outputs to the user application for the purposes of testing. For example, the user can choose a failure outcome for facial recognition or a success outcome to test the behavior of the application for both scenarios.

The details of the SMC 206 can depend on the type of the same-location services the SMC 206 is designed to replace. For example, the SMC 206, in the case of biometric authentication, can include bypassing native device functionality for indicating active enrollment in biometric authentication. The SMC 206 can then provide a selection of the user regarding enrollment or later success/failure of a biometric authentication to the user application. For application calls requesting access to camera, the SMC 206 can bypass the native camera functionality and provide a user-selected image to the user application. In some embodiments, the application 202 is parsed to tag software calls to sensor output data and replace those tagged calls with calls to SMC 206. The SMC 206 is inserted into the application and the application is recompiled into a sensor-instrumented application (SIA) 210. The SIA 210 includes the SMC 206 and rerouted software calls to bypass the native facilities of the remote device for same-location interactions and/or sensor input data requests. In some embodiments, the native facilities are the remote device are only partially bypassed, replaced and/or reconfigured to provide the user application with a pre-selected output. The host 118 can upload the SIA 210 into the remote device 114, and the user can use the SIA 210 to test the user application. The SIA 210 is identical to the user application, except for the same-location or sensor input data interactions. The user will receive prompts on the browser 106, the dashboard or other local application to choose the outcome/outcome of the same-location interactions. For example, the user can choose various workflows in their application, by testing biometric enrollment success/failure and biometric authentication success/failure. The user can also provide images as pre-selected inputs to sensor input data requests from the user's application.

Figure 3:
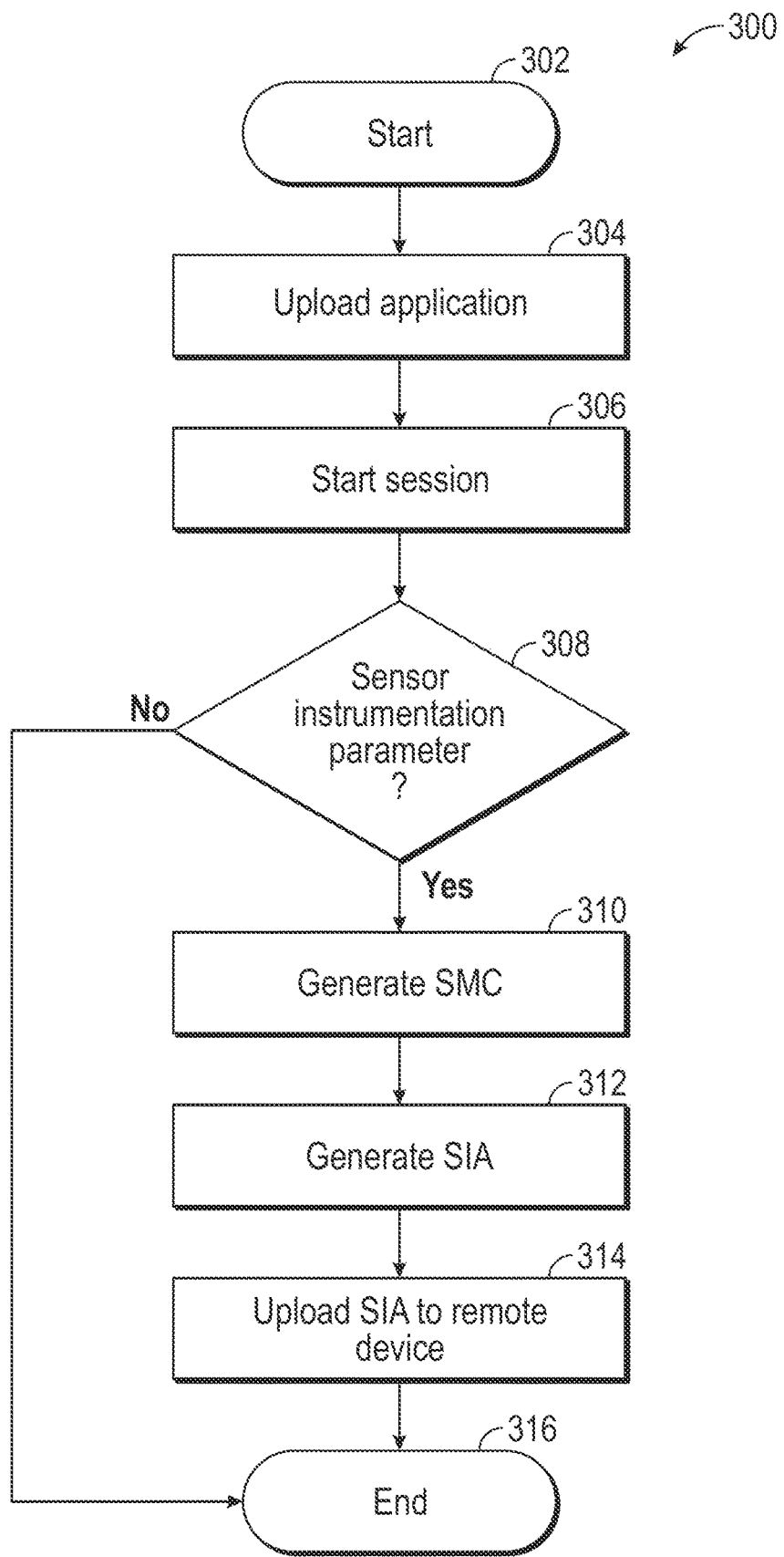
FIG. 3 illustrates an example method of operation of the RDS when a sensor-instrumented application is used.

FIG. 3 illustrates an example method 300 of the RDS 100 when an SIA 210 is used. The method starts at step 302. At step 304, the user uploads an application 202. At step 306, the user requests to start a test and development session to test the application. At step 308, the user can provide a sensor instrumentation parameter, indicating whether or not the application should be instrumented. If the sensor instrumentation parameter indicates a user request to instrument the application, the method continues. If not, the method ends. In some embodiments, the step 308 can be optional, and each application can be automatically instrumented. At step 310, the RDS 100 can generate SMC 206, depending on the type of sensor instrumentation and the type of selected remote device 114. At step 312, the SMC 206 is injected into the application 202 to generate the SIA 210. The timing and manner of generating the SIA 210 can depend on the type of the remote device and its underlying operating system (OS). In some embodiments, the user application 202 provided at step 304 is in APK format. The user application in the APK format can be decompiled, which results in a folder containing DEX format files. DEX files are executable files that are used to initialize and execute applications. The timing of generating the SIA 210 can be cognizant of the OS restrictions, permissions, and facilities. At step 314, the SIA 210 is uploaded into the remote device 114, and the session continues with the SIA 210. In some embodiments, uploading the SIA 210 can be performed by the host 118. In some embodiments, the steps 310 and/or 312 can involve parsing the DEX format files and modifying the DEX files by replacing calls to camera and/or biometric related native system and methods with references of the SMC 206 (the mimicking classes and methods), and recompiling the DEX folder to generate APK or the SIA 210. The method ends at step 316.

In some embodiments, the SIA 210 is introduced to bypass, replace, reroute, or augment the remote device's native programs for biometric authentication. In these scenarios, some native biometric applications may be called, and they in turn, can check to determine if the remote device 114 is enrolled in biometric authentication. Enrollment can refer to the remote device having been previously set up with biometric authentication data, such as a face scan, a fingerprint scan and similar items, as well as device permissions to engage biometric authentication upon request. In a typical case, a selected remote device 114 may not have been previously enrolled in biometric authentication. The SMC 206 and/or the SIA 210 can include software modules to reroute a request for enrollment status to one of the internal components 208 of the SMC 206 to give the user the ability to control what enrollment status parameter is to be passed to the user's application. In other words, the SMC 206 and/or the SIA 210 can include features to enable user to control enrollment status, biometry type of the device (e.g., some devices have fingerprint scanner, facial recognition via camera and/or both), and to mimic biometric responses.

In some embodiments for iOS devices, the SIA 210 can be generated via DyLib injection to bind the SMC 206 with the application 202. This approach can be termed "on the fly DyLib injection." DyLib in iOS environment is a dynamic library that is loaded at runtime, instead of at compile time. Using this approach, the step 306 of method 300 (session start) can be performed after the step 314. Initially, the user application is unchanged, until an indication that the user selects an instrumented session, is received. Then the user application 202 is instrumented by performing steps 310, 312 and 314, and then an instrumented session can start.

Among the native methods that may be modified, include native methods that relate to enrollment status, evaluating the bio sensor data and the sensor type provider methods. For example, in iOS, canEvaluatePolicy returns a Boolean value depending on whether biometric sensor is available on device or not and also if biometric is enrolled or not. EvaluatePolicy function is called by application 202 and the application waits for a callback which is triggered when the user provides input to the biometric sensor and the input is evaluated by the OS. The response in callback is a Boolean value representing whether the biometric matched or not. BiometryType returns the appropriate biometry type of device, (e.g., FaceID or TouchID). In this scenario, the SMC 206 and/or the SIA 210 include functions (e.g., DyLib functions) that mimic the responses of the enrollment status, biosensor evaluation and sensor type provider. For example, the SMC 206 and/or the SIA 210 can mimic responses of canEvaluatePolicy, EvaluablePolicy and BiometryType.

In some embodiments, the SIA 210 is only generated and uploaded to the remote device 114 only for sessions for which the user indicates a selection of yes to sensor instrumentation. The RDS 100 would otherwise upload and maintain an unchanged version of the user application. In this manner, sensor instrumentation code injection and modification does not impact the user's other sessions that may also be running and testing the user application. Furthermore, the described embodiments do not require the user to write a separate application or change their application before uploading to the RDS 100. Instead, changes, modifications and code injections related to sensor instrumentation are performed for the user by the RDS 100, behind the scenes, automatically or in response to a user selection.

The user can provide a selected output of the sensor via a popup in the display 120. For example, the popup can include a button for passing a biometric authentication prompt, for failing, or for canceling the authentication. Alternatively, the prompts can be configurable, so the user can program and test various functionality in response to a biometric authentication request or other sensor output request.

Figure 4:
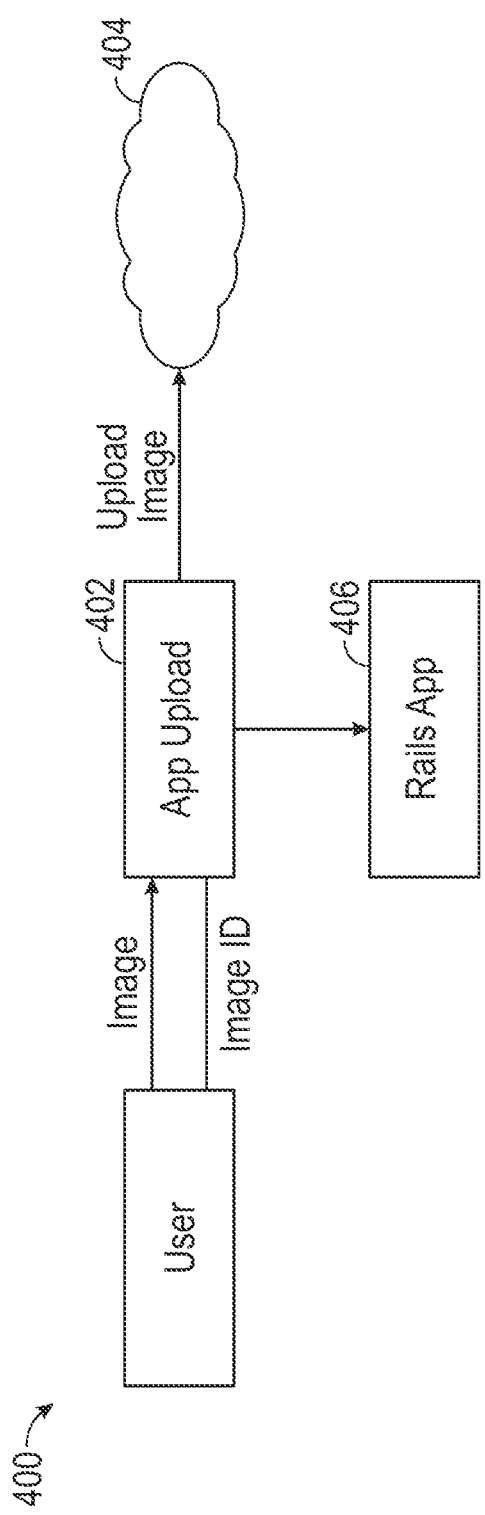
FIG. 4 illustrates a diagram of the workflow for injecting an image as a preselected output from a device sensor to the user application.

FIG. 4 illustrates a diagram 400 of the workflow for injecting an image as a preselected output from a device sensor to the user application. In cases where sensor instrumentation is used for providing an image to the user application, the SMC 206 and/or the SIA 210 can receive an output image from the user and input the image to the user application when the application calls the camera APIs of the remote device 114. The user can also change the output image and/or select an output image from a library of output images.

The RDS 100 can include a facility, such as App Uploader 402, whose functionality can include enabling the user to upload files to the RDS 100. The App Uploader 402 can also be used to receive sensor output images from the user. The sensor output images, received from the user, can be stored in a cloud facility 404 of the RDS 100 or elsewhere in the RDS 100, relative to the remote device. In some embodiments, a selection of the OS methods handling camera of the remote device 114 can be identified and their functionality can be mimicked, rerouted, or otherwise reconfigured by the SMC 206 and/or the SIA 210 to capture and return the user-selected sensor output images to the user application during a test session. Example methods in iOS environment can include AVCapturePhoto and UIImagePickerController. The AVCapturePhoto opens a customizable camera view inside the user application. The method fileDataRepresentation is another method which contains the output image of the camera. UIImagePickerController is a class which invokes the camera API and also implements the imagePickerController, which is called when an image is captured. In some embodiments, the imagePickerController can be replaced by the SMC 206, which can call other camera methods with the user selected output image, instead of any image captured by the camera of the remote device 114. Similar to biometric authentication mimicking, in the image injection scenario, the SMC 206 and the SIA 210 can be generated at the start of a session if the user requests sensor instrumentation on the user application for an upcoming session. The examples provided above are in the iOS environment. Persons of ordinary skill in the art can identify similar methods in the Android and/or other operating system for the purpose of generating the SMC 206 and the SIA 210. For example, in Android environment, camera APIs and related methods can be involved in generating the SMC 206 and/or SIA 210.

In some embodiments, the App Uploader 402 can return an identifier for each image uploaded by the user to allow the user to refer back to the image, replace the image and/or configure other application workflows with the image. Referring to FIG. 2, the RDS 100 can include rails 212 to facilitate communication between the browser 106, the host 118 and other intermediary components of the RDS 100. The rails 212 can include endpoints, APIs, communication ports, communication channels, and other communication features to facilitate data flow between the various components of the RDS 100. One example of details of communication systems and methods used in the RDS 100 is described in U.S. patent application Ser. No. 17/590,812, filed on Feb. 1, 2022, titled, "Remote Device Infrastructure," the content of which is incorporated herein and should be considered part of this disclosure. The rails 212 can include an API, which can be called by the user to indicate a selected image is to be injected at the remote device 114 as the output of the camera in response to a user application request for sensor input. The App Uploader 402 can store the meta data of the image, including image identifier, the image storage path in a storage facility of RailsApp 406. The RailsApp 406 can be an API server implemented in server 110 and/or be part of Rails 212 and be responsible for receiving and routing user interactions related to sensor instrumentation and/or other functionality of the RDS 100.

Figure 5:
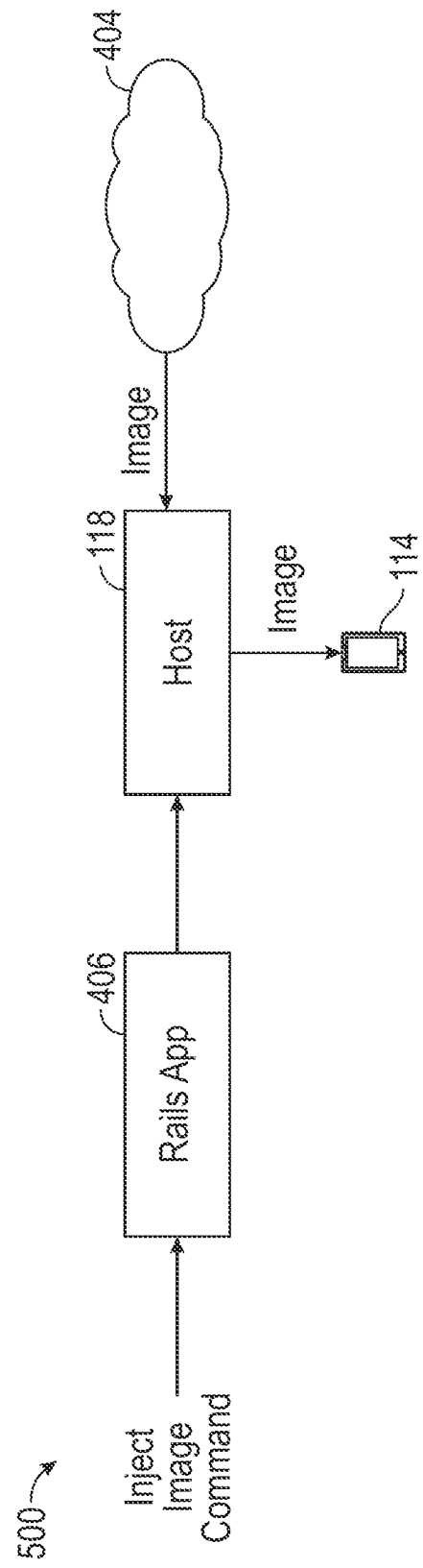
FIG. 5 illustrates a diagram of injecting a user-selected image during a test session.

FIG. 5 illustrates a diagram 500 of injecting a user selected image during a test session. RailsApp 406 receives a user command to inject an image during a test session. RailsApp 406 calls the an API of the host 118 to inject an image. The host 118 downloads the image from the cloud facilities 404. The remote device 114 running the user application calls the API of the host 118 to fetch the downloaded image and uses the image in the application workflow according to the application 202. The user provided image can also be stored elsewhere in the RDS 100, instead of or in addition to the cloud facilities 404, including for example on host 118, or on the server 110.

Figure 6:
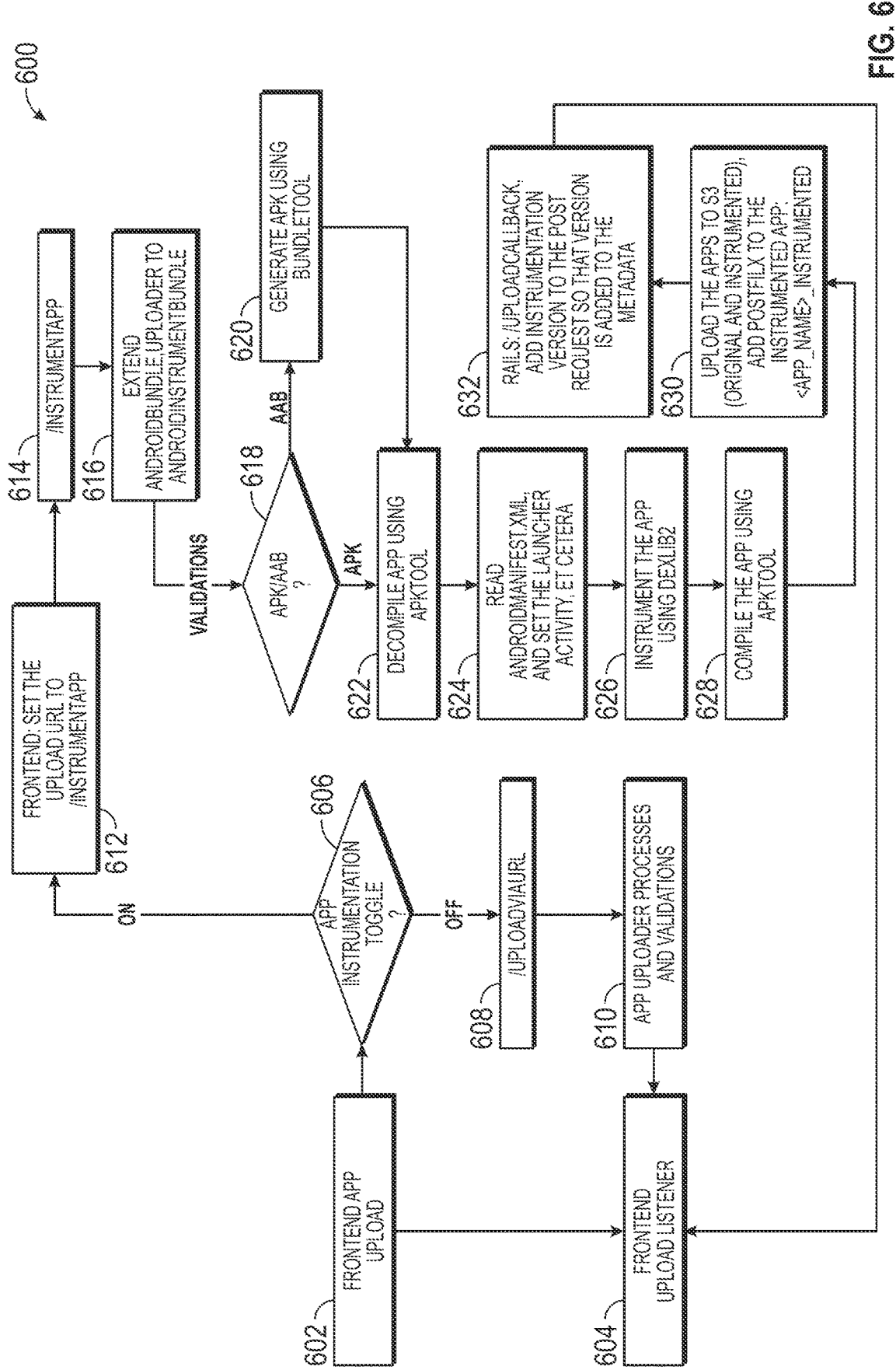
FIG. 6 illustrates a diagram of example operations of the RDS.

FIG. 6 illustrates an example diagram 600 of operations of the RDS 100, which includes generating an SIA 210 in an Android environment. At block 602, the user can upload an application using an uploader, such as App Uploader 402. At block 604, a frontend upload listener can receive a message indicating that the user has uploaded an application. At block 606, an app instrumentation toggle switch can be manipulated by the user indicating whether the user wishes to enable sensor instrumentation. If the switch is off, at block 608, the user application can be uploaded via an upload URL to a resource of the RDS 100. Uploading with a URL is provided as an example. Other methods of upload and access to user code can also be used. At block 610, App Uploader 402 processes and validations are performed. These operations can include aspects of running the user's application on the remote device 114, other than sensor instrumentation. The frontend listener at block 604 can be notified that the App Uploader 402 has successfully performed the processes and validations.

If the app instrumentation toggle switch at block 606 is on, the block 612 generates a command to frontend to set the upload URL address to an address for instrumented applications (as opposed to URLs for un-instrumented versions of users applications). The URL method of handling the storage of instrumented and un-instrumented applications is provided as an example and other techniques can also be used to store the various versions of the user's application. At block 614, the user's application is uploaded to the designated URL in block 612. At block 616, an extend AndroidBundleUploader to AndroidInstrumentBundle command can be performed. At block 618, it is determined whether the application is in Android application package (APK) or in Android application bundle (AAB). If the application is in AAB, at block 620, an APK version of the application is generated. At block 622, the APK application can be decompiled, by using, for example, apktool.

At block 624, the application is parsed to determine the functions and functions calls to and from the application and/or the native facilities of the remote device 114 relating to same-location activity and/or sensor data request from the application. For example, operations in block 624 can involve reading AndroidManifest.xml file to identify candidate replacement functions and function calls. At block 624, launcher activity can also be set according to the parameters of SMC 206 to replace, reroute or otherwise reconfigure function calls to native sensor applications to SMC 206, in part or in whole. At block 626, the application is instrumented by inserting the SMC 206 in the application. For example, in Android environment instrumentation can be performed using dexlib2. Dexlib2 is a library which can be used to read and write bytecode in Dex format. Inserting the SMC 206 in the application will generate the SIA 210. At block 628, the modified application or the SIA 210 can be recompiled, by, for example, using APK tool. At block 630, the SIA 210 can be uploaded to a cloud environment, such as Amazon® Simple Storage Service or S3. Other cloud providers can also be used. In some embodiments, the original, unmodified version of the application can also be uploaded. The instrumented and un-instrumented versions of the application can be so designated. The Rails 212 and appropriate APIs can be updated with the URL address of the instrumented and un-instrumented versions of the application for the user to deploy via the RDS 100.

Figure 7:
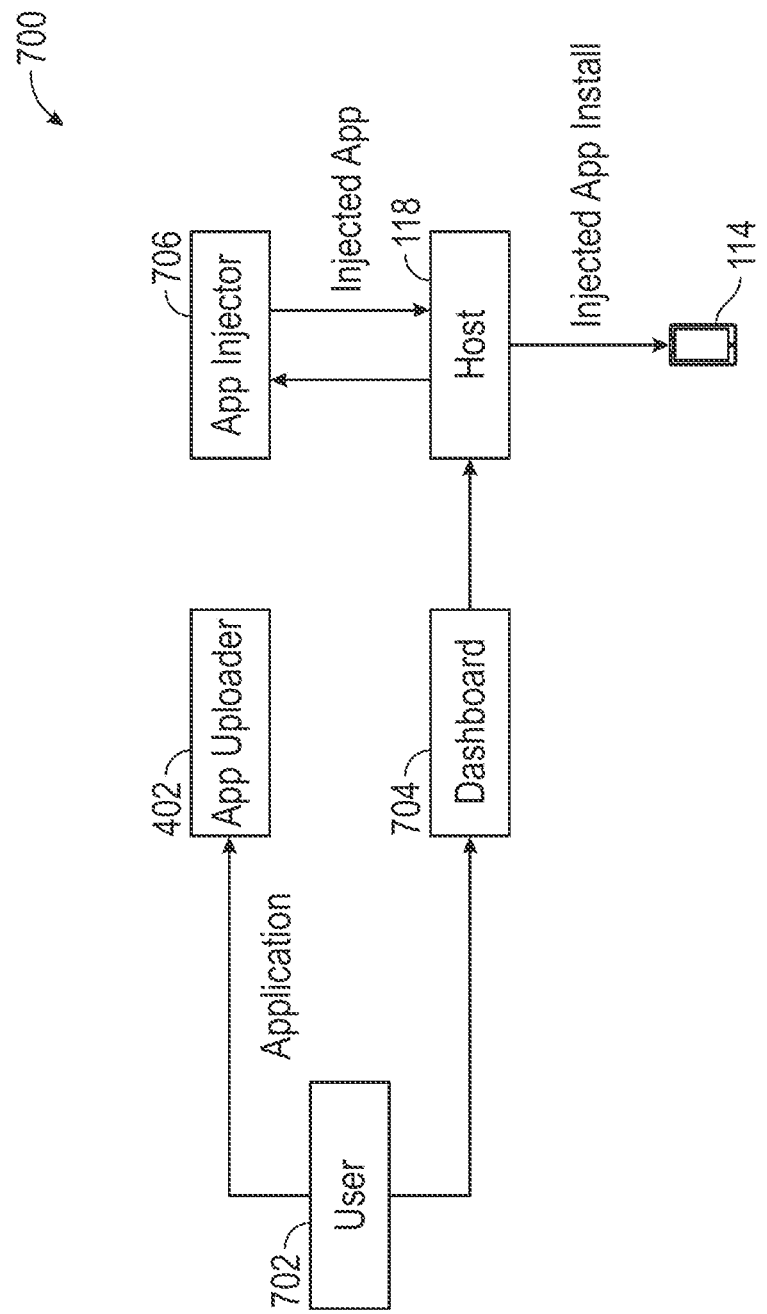
FIG. 7 illustrates a diagram of an example injection workflow.

FIG. 7 illustrates a diagram 700 of an example injection workflow. Injection in this context refers to injecting a modified version of the user application to replace, reroute or otherwise reconfigure select software components of the user application and/or the remote device 114, in whole or in part, to call a replacement framework from the RDS 100, as opposed to the native facilities of the remote device 114, when requesting and receiving sensor data. The user 702 uses the AppUploader 402 to upload an application to the RDS 100. The AppUploader 402 can store the application within the RDS 100, including for example on the host 118. The user can enter a command, via the dashboard 704, to start a test/development session with sensor instrumentation. The host 118 (or other components of the RDS 100) can message an App Injector module 706 to modify the application for example, by generating and inserting the SMC 206 in the application. The App Injector 706 can return the modified application to the host 118. The host 118 can install the modified application on the remote device 114.

Figure 8:
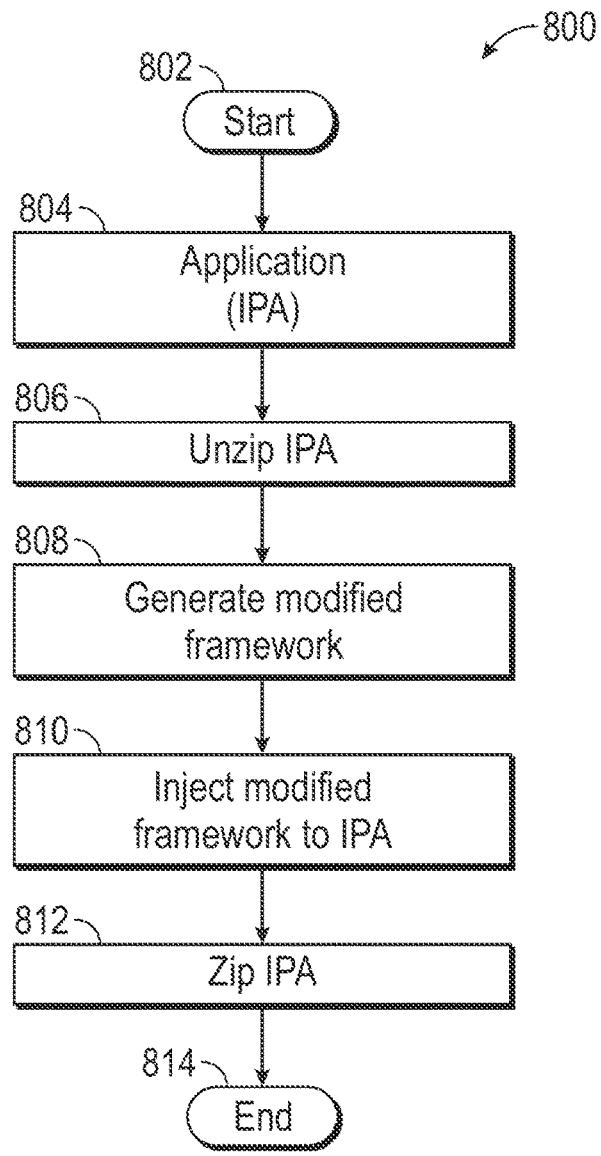
FIG. 8 illustrates an example method of sensor instrumentation.

FIG. 8 illustrates an example method 800 of sensor instrumentation in an iOS environment. The method starts at step 802. At step 804, the user provides the application 202 in an IPA format to the RDS 100. A dot IPA or iOS App Store Package is an iOS application archive file, which stores an iOS app. At step 806, the RDS 100, unzips the IPA file. At step 808, the RDS 100 generates a modified framework for handling device sensor input/output and same-location interactions. At step 810, the modified framework is injected in the unzipped IPA file. The injection can include modifying internal calls of the application to call the modified framework, as opposed to calling the native facilities of the remote device. At step 812, the IPA is zipped. The method ends at step 814.

Figure 9:
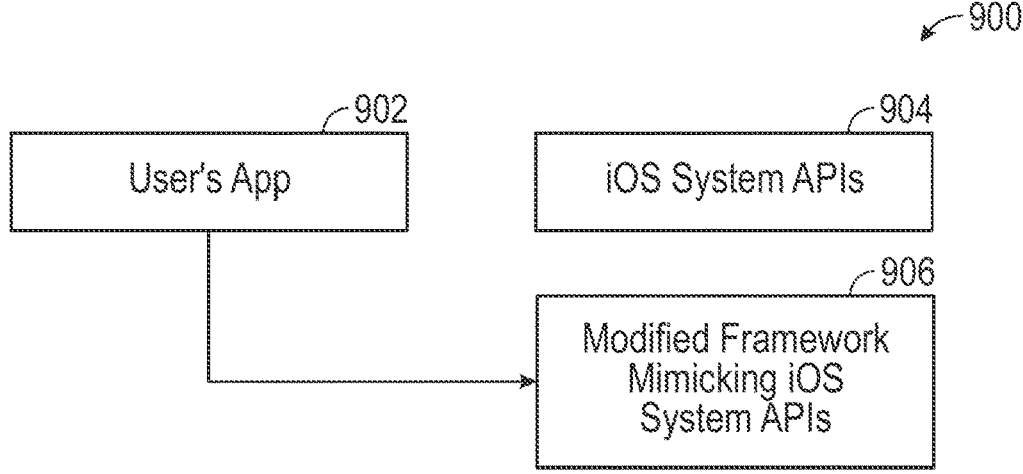
FIG. 9 illustrates a block diagram of an example operation of the RDS, when a user of RDS requests sensor instrumentation during a test and development session.

FIG. 9 illustrates a block diagram of the operations 900 of the RDS 100, when the user requests sensor instrumentation for a test session. If sensor instrumentation is not implemented, user's application at block 902 interacts with iOS (or Android) system APIs at block 904 to handle sensor input/output data requests, including biometric authentication and camera applications. When the user requests sensor instrumentation, the user's application is modified to interact with block 906, a framework mimicking the iOS (or Android) system APIs, instead of the native facilities of the remote device at block 904.

Example Implementation Mechanism—Hardware Overview

Some embodiments are implemented by a computer system or a network of computer systems. A computer system may include a processor, a memory, and a non-transitory computer-readable medium. The memory and non-transitory medium may store instructions for performing methods, steps and techniques described herein.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be server computers, cloud computing computers, desktop computer systems, portable computer systems, handheld devices, networking devices or any other device that incorporates hard-wired and/or program logic to implement the techniques.

Figure 10:
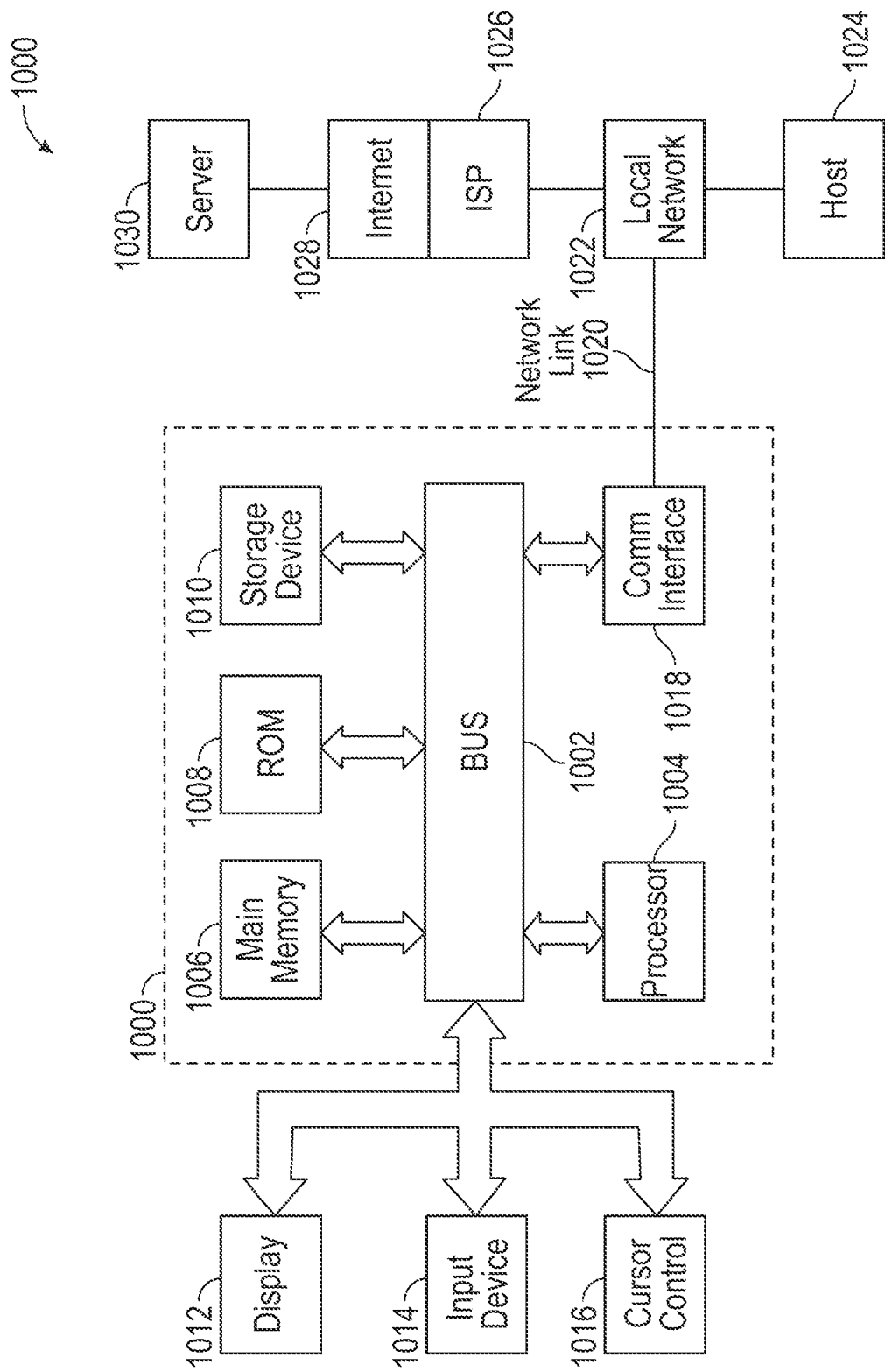
FIG. 10 illustrates an example data flow diagram of the operations of an infrastructure enabling a remote session using a remote device, using a video capturing API.

For example, FIG. 10 is a block diagram that illustrates a computer system 1000 upon which an embodiment of can be implemented. Computer system 1000 includes a bus 1002 or other communication mechanism for communicating information, and a hardware processor 1004 coupled with bus 1002 for processing information. Hardware processor 1004 may be, for example, special-purpose microprocessor optimized for handling audio and video streams generated, transmitted or received in video conferencing architectures.

Computer system 1000 also includes a main memory 1006, such as a random access memory (RAM) or other dynamic storage device, coupled to bus 1002 for storing information and instructions to be executed by processor 1004. Main memory 1006 also may be used for storing temporary variables or other intermediate information during execution of instructions to be executed by processor 1004. Such instructions, when stored in non-transitory storage media accessible to processor 1004, render computer system 1000 into a special-purpose machine that is customized to perform the operations specified in the instructions.

Computer system 1000 further includes a read only memory (ROM) 1008 or other static storage device coupled to bus 1002 for storing static information and instructions for processor 1004. A storage device 1010, such as a magnetic disk, optical disk, or solid state disk is provided and coupled to bus 1002 for storing information and instructions.

Computer system 1000 may be coupled via bus 1002 to a display 1012, such as a cathode ray tube (CRT), liquid crystal display (LCD), organic light-emitting diode (OLED), or a touchscreen for displaying information to a computer user. An input device 1014, including alphanumeric and other keys (e.g., in a touch screen display) is coupled to bus 1002 for communicating information and command selections to processor 1004. Another type of user input device is cursor control 1016, such as a mouse, a trackball, or cursor direction keys for communicating direction information and command selections to processor 1004 and for controlling cursor movement on display 1012. This input device typically has two degrees of freedom in two axes, a first axis (e.g., x) and a second axis (e.g., y), that allows the device to specify positions in a plane. In some embodiments, the user input device 1014 and/or the cursor control 1016 can be implemented in the display 1012 for example, via a touchscreen interface that serves as both output display and input device.

Computer system 1000 may implement the techniques described herein using customized hard-wired logic, one or more ASICs or FPGAs, firmware and/or program logic which in combination with the computer system causes or programs computer system 1000 to be a special-purpose machine. According to one embodiment, the techniques herein are performed by computer system 1000 in response to processor 1004 executing one or more sequences of one or more instructions contained in main memory 1006. Such instructions may be read into main memory 1006 from another storage medium, such as storage device 1010. Execution of the sequences of instructions contained in main memory 1006 causes processor 1004 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical, magnetic, and/or solid-state disks, such as storage device 1010. Volatile media includes dynamic memory, such as main memory 1006. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1002. Transmission media can also take the form of acoustic or light waves, such as those generated during radio-wave and infra-red data communications.

Various forms of media may be involved in carrying one or more sequences of one or more instructions to processor 1004 for execution. For example, the instructions may initially be carried on a magnetic disk or solid state drive of a remote computer. The remote computer can load the instructions into its dynamic memory and send the instructions over a telephone line using a modem. A modem local to computer system 1000 can receive the data on the telephone line and use an infra-red transmitter to convert the data to an infra-red signal. An infra-red detector can receive the data carried in the infra-red signal and appropriate circuitry can place the data on bus 1002. Bus 1002 carries the data to main memory 1006, from which processor 1004 retrieves and executes the instructions. The instructions received by main memory 1006 may optionally be stored on storage device 1010 either before or after execution by processor 1004.

Computer system 1000 also includes a communication interface 1018 coupled to bus 1002. Communication interface 1018 provides a two-way data communication coupling to a network link 1020 that is connected to a local network 1022. For example, communication interface 1018 may be an integrated services digital network (ISDN) card, cable modem, satellite modem, or a modem to provide a data communication connection to a corresponding type of telephone line. As another example, communication interface 1018 may be a local area network (LAN) card to provide a data communication connection to a compatible LAN. Wireless links may also be implemented. In any such implementation, communication interface 1018 sends and receives electrical, electromagnetic or optical signals that carry digital data streams representing various types of information.

Network link 1020 typically provides data communication through one or more networks to other data devices. For example, network link 1020 may provide a connection through local network 1022 to a host computer 1024 or to data equipment operated by an Internet Service Provider (ISP) 1026. ISP 1026 in turn provides data communication services through the worldwide packet data communication network now commonly referred to as the "Internet" 1028. Local network 1022 and Internet 1028 both use electrical, electromagnetic or optical signals that carry digital data streams. The signals through the various networks and the signals on network link 1020 and through communication interface 1018, which carry the digital data to and from computer system 1000, are example forms of transmission media.

Computer system 1000 can send messages and receive data, including program code, through the network(s), network link 1020 and communication interface 1018. In the Internet example, a server 1030 might transmit a requested code for an application program through Internet 1028, ISP 1026, local network 1022 and communication interface 1018. The received code may be executed by processor 1004 as it is received, and/or stored in storage device 1010, or other non-volatile storage for later execution.

EXAMPLES

It will be appreciated that the present disclosure may include any one and up to all of the following examples.

Example 1: A method comprising: configuring a remote device at a first location to run a development session controlled by a user at a second location; receiving an application from the user; receiving a user selection to enable sensor instrumentation on the application; generating mimic code, configured to receive application requests for sensor data from the remote device and output a user selected response to the application; and injecting the mimic code in the application, replacing application and/or operating system functions of the remote device corresponding to capturing and/or responding to sensor requests from the application.

Example 2: The method of Example 1, wherein the injecting further comprises: decompiling the application; inserting the mimic code in the application; modifying the application and/or the operating system function calls to route application requests for sensor data to the mimic code; modifying the application to receive an output for sensor data from the mimic code; and recompiling the application with the mimic code and the modified application.

Example 3: The method of any or all of Examples 1 and 2, further comprising: modifying the application by rerouting application calls to native facilities of the remote device corresponding to sensor data to route to the mimic code instead; compiling the modified application with the mimic code; and installing the compiled modified application and the mimic code on the remote device.

Example 4: The method of any or all of Examples 1-3, further comprising: modifying the application by rerouting application calls to native facilities of the remote device corresponding to sensor data to route to the mimic code instead; compiling the modified application with the mimic code; installing the compiled modified application and the mimic code on the remote device; receiving an image from the user; and providing the image as a sensor output to the application during a development session, when the application requests sensor data.

Example 5: The method of any or all of Examples 1-4, wherein the mimic code partially replaces native biometric authentication functions of the remote device, providing the user selected output from the native biometric authentication functions of the remote device to the application during a development session.

Example 6: The method of any or all of Examples 1-5, wherein the mimic code partially or entirely replaces native camera functions of the remote device, providing a user-selected image to the application as the camera output to the application during a development session.

Example 7: The method of any or all of Examples 1-6, wherein the application is in APK or IPA format.

Example 8: A non-transitory computer storage that stores executable program instructions that, when executed by one or more computing devices, configure the one or more computing devices to perform operations comprising: configuring a remote device at a first location to run a development session controlled by a user at a second location; receiving an application from the user; receiving a user selection to enable sensor instrumentation on the application; generating mimic code, configured to receive application requests for sensor data from the remote device and output a user selected response to the application; and injecting the mimic code in the application, replacing application and/or operating system functions of the remote device corresponding to capturing and/or responding to sensor requests from the application.

Example 9: The non-transitory computer storage of Example 8, wherein the injecting further comprises: decompiling the application; inserting the mimic code in the application; modifying the application and/or the operating system function calls to route application requests for sensor data to the mimic code; modifying the application to receive an output for sensor data from the mimic code; and recompiling the application with the mimic code and the modified application.

Example 10: The non-transitory computer storage of any or all of Examples 8 and 9, wherein the operations further comprise: modifying the application by rerouting application calls to native facilities of the remote device corresponding to sensor data to route to the mimic code instead; compiling the modified application with the mimic code; and installing the compiled modified application and the mimic code on the remote device.

Example 11: The non-transitory computer storage of any or all of Examples 8-11, wherein the operations further comprise: modifying the application by rerouting application calls to native facilities of the remote device corresponding to sensor data to route to the mimic code instead; compiling the modified application with the mimic code; installing the compiled modified application and the mimic code on the remote device; receiving an image from the user; and providing the image as a sensor output to the application during a development session, when the application requests sensor data.

Example 12: The non-transitory computer storage of any or all of Examples 8-11, wherein the mimic code partially replaces native biometric authentication functions of the remote device, providing the user selected output from the native biometric authentication functions of the remote device to the application during a development session.

Example 13: The non-transitory computer storage of any or all of Examples 8-12, wherein the mimic code partially or entirely replaces native camera functions of the remote device, providing a user-selected image to the application as the camera output to the application during a development session.

Example 14: The non-transitory computer storage of any or all of Examples 8-13, wherein the application is in APK or IPA format.

Example 15: A system comprising a processor, the processor configured to perform operations comprising: configuring a remote device at a first location to run a development session controlled by a user at a second location; receiving an application from the user; receiving a user selection to enable sensor instrumentation on the application; generating mimic code, configured to receive application requests for sensor data from the remote device and output a user selected response to the application; and injecting the mimic code in the application, replacing application and/or operating system functions of the remote device corresponding to capturing and/or responding to sensor requests from the application.

Example 16: The system of Example 15, wherein the injecting further comprises:

decompiling the application; inserting the mimic code in the application; modifying the application and/or the operating system function calls to route application requests for sensor data to the mimic code; modifying the application to receive an output for sensor data from the mimic code; and recompiling the application with the mimic code and the modified application.

Example 17: The system of any or all of Examples 15 and 16, wherein the operations further comprise: modifying the application by rerouting application calls to native facilities of the remote device corresponding to sensor data to route to the mimic code instead; compiling the modified application with the mimic code; and installing the compiled modified application and the mimic code on the remote device.

Example 18: The system of any or all of Examples 15-17, wherein the operations further comprise: modifying the application by rerouting application calls to native facilities of the remote device corresponding to sensor data to route to the mimic code instead; compiling the modified application with the mimic code; installing the compiled modified application and the mimic code on the remote device; receiving an image from the user; and providing the image as a sensor output to the application during a development session, when the application requests sensor data.

Example 19: The system of any or all of Examples 15-18, wherein the mimic code partially replaces native biometric authentication functions of the remote device, providing the user selected output from the native biometric authentication functions of the remote device to the application during a development session.

Example 20: The system of any or all of Examples 15-19, wherein the mimic code partially or entirely replaces native camera functions of the remote device, providing a user-selected image to the application as the camera output to the application during a development session.

While the invention has been particularly shown and described with reference to specific embodiments thereof, it should be understood that changes in the form and details of the disclosed embodiments may be made without departing from the scope of the invention. Although various advantages, aspects, and objects of the present invention have been discussed herein with reference to various embodiments, it will be understood that the scope of the invention should not be limited by reference to such advantages, aspects, and objects. Rather, the scope of the invention should be determined with reference to patent claims.

What is claimed is:

1. A method comprising:
   receiving an application, executable on a device;
   generating mimic code, configured to receive, from the application, a request for sensor data, the mimic code further configured to output a selected response to the request for sensor data from the application; and
   injecting the mimic code in the application, replacing application and/or operating system functions of the device corresponding to capturing and/or responding to the sensor data request from the application, wherein the injecting further comprises:
   decompiling the application;
   modifying the application and/or the operating system function calls to route the application request for sensor data to the mimic code;
   modifying the application to receive, from the mimic code, the selected response to the application request for sensor data; and
   recompiling the modified application.

2. The method of claim 1, wherein the device comprises native facilities for responding to the sensor data request, and the method further comprises:
   modifying the application, by rerouting application calls to the native facilities of the device to route to the mimic code instead.

3. The method of claim 1, wherein the device comprises native facilities for responding to the sensor data request, and the method further comprises:
   modifying the application, by rerouting application calls to the native facilities of the device to route to the mimic code instead; and
   providing a selected image as the selected response to the sensor data request.

4. The method of claim 1, wherein the device comprises native biometric authentication functions and the request for sensor data comprises a request for output from the native biometric authentication functions of the device, wherein the mimic code partially or entirely replaces the native biometric authentication functions of the device, providing the selected response to the application.

5. The method of claim 1, wherein the application request for sensor data comprises a request for camera output, wherein the mimic code partially or entirely replaces native camera functions of the device, providing a selected image to the application as the selected response to the request for sensor data.

6. The method of claim 1, wherein the application is in Android® Application Package (APK) or iOS® application archive file (IPA) format.

7. The method of claim 1, further comprising providing a user interface configured to receive a selection of a response to the request for sensor data.

8. A non-transitory computer storage that stores executable program instructions that, when executed by one or more computing devices, configure the one or more computing devices to perform operations comprising:
  receiving an application, executable on a device;
  generating mimic code, configured to receive, from the application, a request for sensor data, the mimic code further configured to output a selected response to the request for sensor data from the application; and
  injecting the mimic code in the application, replacing application and/or operating system functions of the device corresponding to capturing and/or responding to the sensor data request from the application, wherein the injecting further comprises:
    decompiling the application;
    modifying the application and/or the operating system function calls to route the application request for sensor data to the mimic code;
    modifying the application to receive, from the mimic code, the selected response to the application request for sensor data; and
    recompiling the modified application.

9. The non-transitory computer storage of claim 8, wherein the device comprises native facilities for responding to the sensor data request, and wherein the operations further comprise:
  modifying the application by rerouting application calls to the native facilities of the device to route to the mimic code instead.

10. The non-transitory computer storage of claim 8, wherein the device comprises native facilities for responding to the sensor data request, and wherein the operations further comprise:
  modifying the application by rerouting application calls to the native facilities of the device to route to the mimic code instead; and
  providing a selected image as the selected response to the sensor data request.

11. The non-transitory computer storage of claim 8, wherein the device comprises native biometric authentication functions and the request for sensor data comprises a request for output from the native biometric authentication functions of the device, and wherein the mimic code partially or entirely replaces the native biometric authentication functions of the device, providing the selected response to the application.

12. The non-transitory computer storage of claim 8, wherein the application request for sensor data comprises a request for camera output, wherein the mimic code partially or entirely replaces native camera functions of the device, providing a selected image to the application as the selected response to the request for sensor data.

13. The non-transitory computer storage of claim 8, wherein the application is in Android® Application Package (APK) or iOS® application archive file (IPA) format.

14. The non-transitory computer storage of claim 8, wherein the operations further comprise: providing a user interface configured to receive a selection of a response to the request for sensor data.

15. A system comprising a processor, the processor configured to perform operations comprising:
  receiving an application, executable on a device;
  generating mimic code, configured to receive, from the application, a request for sensor data, the mimic code further configured to output a selected response to the request for sensor data from the application; and
  injecting the mimic code in the application, replacing application and/or operating system functions of the device corresponding to capturing and/or responding to the sensor data request from the application, wherein the injecting further comprises:
    decompiling the application;
    modifying the application and/or the operating system function calls to route the application request for sensor data to the mimic code;
    modifying the application to receive, from the mimic code, the selected response to the application request for sensor data; and
    recompiling the modified application.

16. The system of claim 15, wherein the device comprises native facilities for responding to the sensor data request, and wherein the operations further comprise:
  modifying the application by rerouting application calls to the native facilities of the device to route to the mimic code instead.

17. The system of claim 15, wherein the device comprises native facilities for responding to the sensor data request, and wherein the operations further comprise:
  modifying the application by rerouting application calls to the native facilities of the device to route to the mimic code instead; and
  providing a selected image as the selected response to the sensor data request.

18. The system of claim 15, wherein the device comprises native biometric authentication functions and the request for sensor data comprises a request for output from the native biometric authentication functions of the device, and wherein the mimic code partially or entirely replaces the native biometric authentication functions of the device, providing the selected response to the application.

19. The system of claim 15, wherein the application request for sensor data comprises a request for camera output, and wherein the mimic code partially or entirely replaces native camera functions of the device, providing a selected image to the application as the selected response to the request for sensor data.

20. The system of claim 15, wherein the operations further comprise: providing a user interface configured to receive a selection of a response to the request for sensor data.

\* \* \* \* \*